No. 885,604. PATENTED APR. 21, 1908.
G. H. GILBERT.
MEANS FOR OPERATING CLUTCHES.
APPLICATION FILED JAN. 24, 1908.
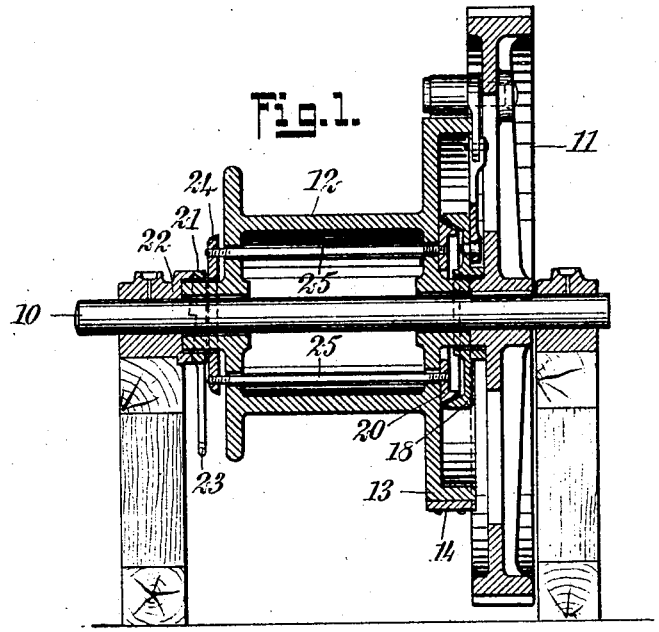
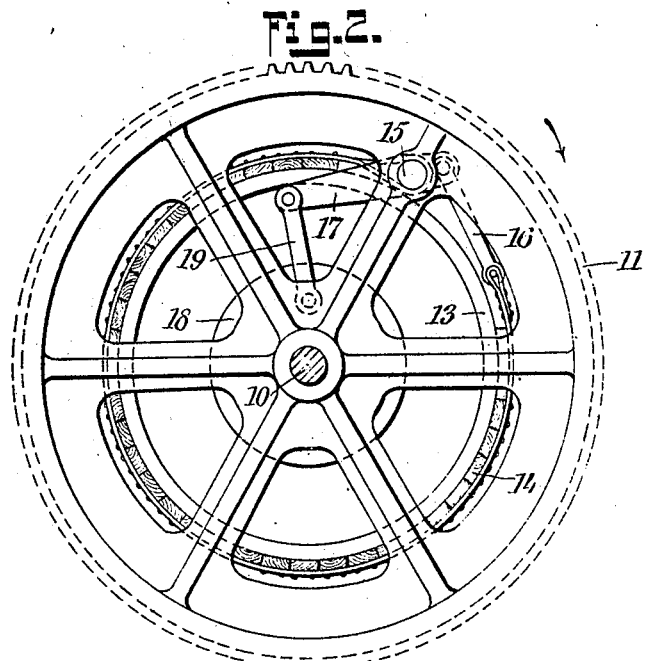
WITNESSES
Chas. A. Clark.
C. O. Fairbank
INVENTOR
Gilbert H. Gilbert
BY Munn & Co.
ATTORNEYS

UNITED STATES PATENT OFFICE.

GILBERT H. GILBERT, OF NEW YORK, N. Y.

MEANS FOR OPERATING CLUTCHES.

No. 885,604.

Specification of Letters Patent.

Patented April 21, 1908.

Application filed January 24, 1908. Serial No. 412,432.

*To all whom it may concern:*

Be it known that I, GILBERT H. GILBERT, a subject of the King of Great Britain, and a resident of the city of New York, borough of Manhattan, in the county and State of New York, have invented a new and Improved Means for Operating Clutches, of which the following is a full, clear, and exact description.
This invention relates to certain improvements in mechanisms for operating clutches on large and heavy machinery and involves the use of a second clutch for applying the driving clutch.
Various constructions have been devised in which two or more clutches are employed, one of the clutches serving to operate the other clutch, but in my improved mechanism the second clutch does not perform any driving function, but serves merely and solely as an extremely simple and efficient means of throwing the main heavy driving clutch into or out of operation.

Reference is to be had to the accompanying drawings, forming a part of this specification, in which similar characters of reference indicate corresponding parts in all the figures, and in which Figure 1 is a longitudinal section through a mechanism constructed in accordance with my invention; Fig. 2 is an end view thereof; and Fig. 3 is a plan of a detail of construction.

In order to clearly illustrate the construction and operation of my improved mechanism, I have illustrated a common form of winding drum, modified to incorporate my improved mechanism for applying the clutch. The shaft 10 is mounted in any suitable form of supports and has keyed thereto a large driving gear 11, continuously rotated from the engine. Loosely mounted on the shaft is the winding drum 12, and a suitable clutch is provided for locking the driving gear to the drum, so that the latter may be rotated.
As shown, the winding drum carries a clutch drum 13, encircled by a friction band 14. One end of the band is secured to a pin 15 extending laterally from the side of the gear wheel, and the other end of the band is connected by a link 16 to an operating lever 17 pivoted intermediate its ends on the pin 15 above referred to. The band 14, link 16, and lever 17 are carried by the driving gear and continuously rotate adjacent the clutch drum 13. By rotating the lever 17, the band may be tightened to grip the drum and cause the rotation of the winding drum 12 with the driving gear.

As a means for operating the lever 17 and throwing the driving clutch into or out of operation, I provide the main feature of my invention, which comprises a second clutch, so constructed and mounted that it does not in any way constitute a driving clutch, but acts merely as a clutch-applying means. As shown, this second clutch comprises a clutch member 18 in the form of a cup and loosely mounted to rotate on the hub of the winding drum or the driving gear. The clutch member or cup is connected by a link 19 to the end of the operating lever 17. The winding drum carries the other clutch member 20, which is in the form of a cone and is longitudinally movable to bring it into engagement with the clutch member 18. The cone may be moved in any suitable manner, as, for instance, by means of a collar 21, having a cam surface engaging with a portion of the bearing 22 for the shaft and having an operating handle or lever 23 for rotating the collar. A rotation of the collar causes it to move longitudinally against a collar 24 connected to the clutch member by a plurality of rods 25.
In the operation of my improved clutch-applying means, the collar 21 is rotated by means of the lever 23 to force the clutch member 20 into engagement with the clutch member 18. As the former is non-rotatably connected to the driving drum and the latter is carried around by the driving gear, the engagement of the two members causes the retardation or stopping of the clutch member 18. The continued movement of the driving gear varies the position of the lever 17 in respect to the stationary clutch member 18 and causes said lever to take a more nearly radial position. This tightens the band onto the clutch drum 13, and the winding drum is caused to rotate with the driving gear.

I have illustrated and described my improved mechanism in connection with a particular form of driving member and a particular form of driven member having a band clutch for connecting them, but it is evident that various other forms of clutches used in connecting other forms of driving members to other forms of driven members, may be operated by the use of such a secondary clutch as illustrated. It is also evident that the specific details of this second clutch may be varied within wide limits.

Having thus described my invention, I claim as new and desire to secure by Letters Patent:

1. The combination of a driven member having a clutch drum, a driving member having a band encircling said drum, a lever pivoted to said driving member for tightening said band, a clutch within said drum, comprising a clutch member carried by the driven member and longitudinally movable in respect thereto and a second clutch member unattached to said driving member or driven member, and a link connecting said last-mentioned clutch member and said lever.

2. The combination of a driven member, a driving member, a clutch for connecting said members, a pivoted lever for applying said clutch, a second clutch comprising two clutch members, one of which is carried by said driven member and non-rotatable in respect thereto, and the other of which is unattached to the driving member or the driven member, and a link connecting said last-mentioned clutch member and said lever whereby when said last-mentioned clutch is thrown into operation, the last-mentioned clutch member is retarded and the first-mentioned clutch thrown into operation through the action of the link and lever.

3. In combination with a driving member, a driven member and a clutch member, including a drum and a band encircling the same for directly connecting said members, of a clutch-applying means, comprising an operating lever connected to said band, and a second clutch, including a clutch member carried by said driven member and longitudinally movable but non-rotatable in respect thereto, and a second clutch member unattached to either said driving member or said driven member but operatively connected to said lever.

In testimony whereof I have signed my name to this specification in the presence of two subscribing witnesses.

GILBERT H. GILBERT

Witnesses
 CLAIR W. FAIRBANK,
 JOHN P. DAVIS.